US007012649B2

(12) United States Patent
Michel

(10) Patent No.: US 7,012,649 B2
(45) Date of Patent: Mar. 14, 2006

(54) IMAGE PROCESSING APPARATUS AND METHOD, PROGRAM, AND RECORDING MEDIUM

(75) Inventor: Xavier Michel, Chiba (JP)

(73) Assignee: Sony Corporation, (JP)

(*) Notice: Subject to any disclaimer, the term of this patent is extended or adjusted under 35 U.S.C. 154(b) by 551 days.

(21) Appl. No.: 10/029,849

(22) Filed: Dec. 31, 2001

(65) Prior Publication Data
US 2002/0093587 A1    Jul. 18, 2002

(30) Foreign Application Priority Data
Jan. 15, 2001    (JP)    ............... P2001-006365

(51) Int. Cl.
*H04N 7/01*    (2006.01)
(52) U.S. Cl. .................... 348/448; 348/452
(58) Field of Classification Search ........ 348/448–452, 348/625–631; H04N 5/208, 7/01, 11/20
See application file for complete search history.

(56) References Cited

U.S. PATENT DOCUMENTS 5,428,398 A * 6/1995 Faroudja ............. 348/452
6,141,056 A * 10/2000 Westerman ........... 348/448

FOREIGN PATENT DOCUMENTS

JP    HEI 3-42832    2/1987

OTHER PUBLICATIONS

Markhauser et al. "Motion Adaptive Pro-Scan Converter With Two Dimensional Contour Enhancement" IEEE Transaction on Consumer Electronics, vol. 36, No. 2, May 1990.*

* cited by examiner

*Primary Examiner*—Sherrie Hsia
(74) *Attorney, Agent, or Firm*—Rader, Fishman & Grauer PLLC; Ronald P. Kananen

(57) ABSTRACT

Image refreshers enhance edge portions of field data stored in field memories, and then store the result in field memories. An intra-field interpolating unit interpolates a moving image pixel using a single piece of field data stored in the field memory, and then stores the moving image pixel in an interpolation memory. An inter-field interpolating unit interpolates a still image pixel using two pieces of field data stored in the field memories, and then stores the still image pixel in an interpolation memory. A still/moving image area determining unit determines whether each pixel of a progressive picture is a still image pixel or a moving image pixel. On the basis of a result of the determination by the still/moving image area determining unit, a selector reads a pixel value in the interpolation memory for a moving image pixel, and reads a pixel value from the interpolation memory for a still image pixel.

14 Claims, 14 Drawing Sheets

☐ A AREA
⌐ ⌐ B AREA
└ ┘

☐ A AREA
⌞ ⌟ B AREA

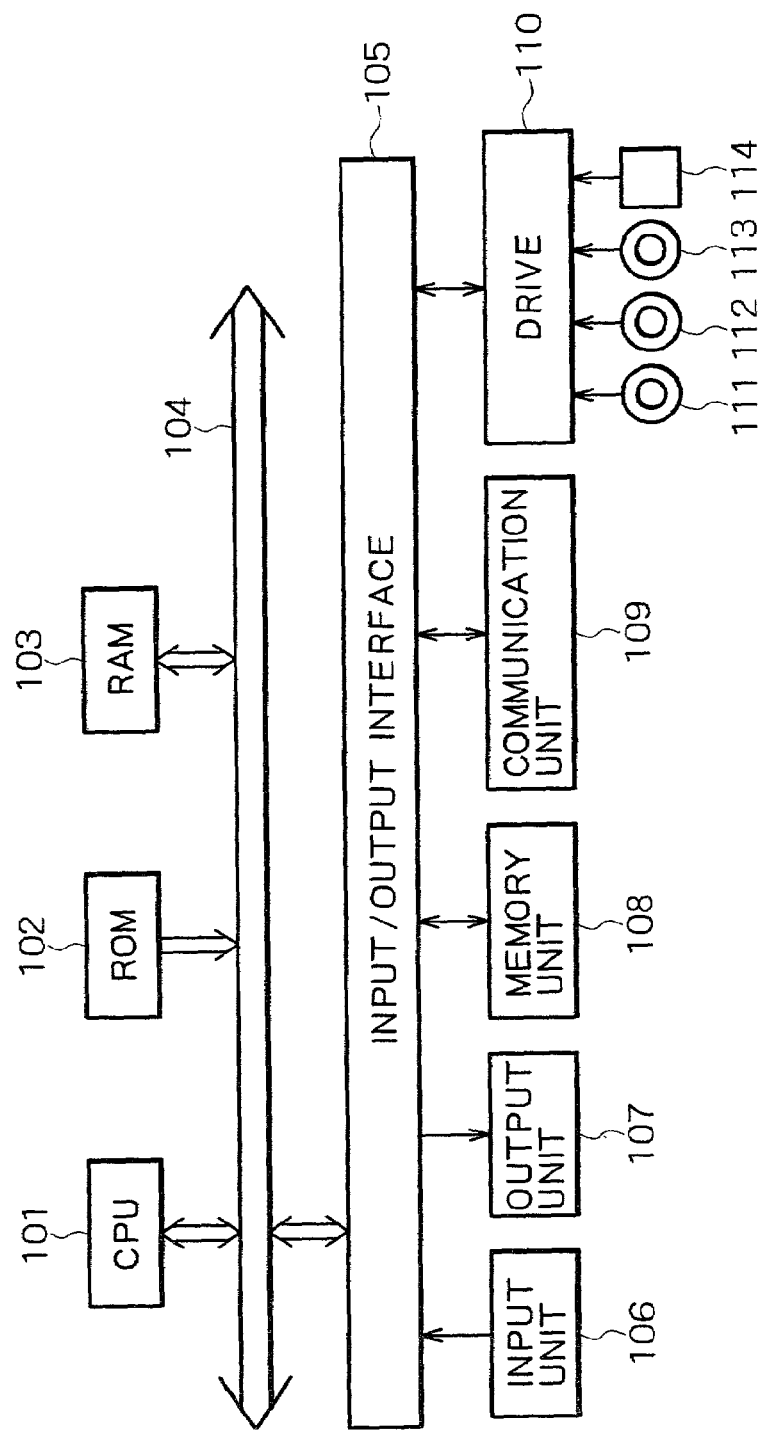

IMAGE PROCESSING APPARATUS AND METHOD, PROGRAM, AND RECORDING MEDIUM

BACKGROUND OF THE INVENTION

The present invention relates to an apparatus, a method, a program, and a recording medium for image processing and, particularly, to an apparatus, a method, a program, and a recording medium for image processing that, in converting an interlaced scanning image into a progressive scanning image, improve vertical resolution in a still image area, smoothly interpolate an edge in a moving image area, and prevent an error in the conversion.

Techniques for converting an interlaced scanning image into a progressive scanning image (IP conversion) are widely spreading.

The interlaced scanning system scans every other scanning line of an actual display image (performs scanning by skipping every other scanning line). One image scanned by the interlaced scanning system is referred to as a field. When continuous images are displayed, adjacent fields have pixels displaced from each other by one scanning line, and such continuous fields are displayed alternately.

As opposed to the interlaced scanning system, the progressive scanning system scans all scanning lines of the display image. Hence, the process of converting an interlaced scanning image into a progressive scanning image is that of interpolating pixels on lines with no pixels in the interlaced scanning image using originally present pixels, and thereby generating pixels on all the scanning lines.

Conventional interpolation methods include a method referred to as double writing, which scans each scanning line twice by display with a delay corresponding to one scanning line, and a method of linear interpolation using pixels in a vertical direction.

In addition, a method has been proposed which uses information of a plurality of fields to enhance vertical resolution. Since, in the case of continuous fields of the interlaced scanning system, a field immediately preceding a current field is displaced by one scanning line in relation to the current field, as described above, a pixel on the immediately preceding field is present at a position to be interpolated on the current field. Specifically, when the pixel to be interpolated is a still image pixel, the pixel on the immediately preceding field is used as it is for interpolation, and in the case that the pixel to be interpolated is a moving image pixel, the pixel to be interpolated is interpolated by linear interpolation using an upper and a lower pixel on the current field.

However, when the above double writing method is used, for example, an image representing an oblique edge is displayed as large steps as a result of the IP conversion.

In addition, although the linear interpolation improves the display image as compared with the double writing, the linear interpolation may result in a slightly blurred display. Furthermore, as in the case of the double writing, an oblique edge is displayed as steps as a result of the linear interpolation.

In order to prevent a stepwise display of an edge in an oblique direction, a method has been proposed which carries out IP conversion while detecting the direction of the edge. The method is disclosed in Japanese Patent Laid-Open No. Hei 3-42832. The method determines the differences in absolute values of three sets of pixels; i.e., a set of an upper and a lower pixel, a set of an upper right and a lower left pixel, and a set of a lower right and an upper left pixel with a remarked pixel to be interpolated as a center, and then interpolates the remarked pixel by using a combination of pixels having the lowest value. When all the values are higher than a predetermined value, the method interpolates the remarked pixel by copying the value of the upper pixel. Thus, even when an oblique edge is present, the method enables smooth interpolation in a direction of the oblique edge.

However, although the method of carrying out conversion while detecting the direction of the edge improves the display of the oblique edge, the method unfavorably lowers vertical resolution in a still image area as compared with the method using a plurality of fields. Moreover, when applied to an actual image, the method of carrying out conversion while detecting the direction of the edge may calculate correlation in the oblique direction somewhat higher than in the vertical direction, depending on noise or conditions of illumination, for example. This tends to result in an error in which an actual pattern continuous in the vertical direction is not displayed correctly.

In addition, a common video signal or the like includes only a slight high-frequency component, and thus an edge appears only as a blurred image. Therefore, it is difficult to detect the direction of a local edge accurately, and even when an edge in a specific direction is to be enhanced, a plurality of edge directions are detected as candidates, which renders selection impossible. As a result, the image can be generated only with the same level of image quality as that of the conventional linear interpolation.

SUMMARY OF THE INVENTION

The present invention has been made in view of the above, and it is accordingly an object of the present invention to improve vertical resolution in a still image portion, smoothly interpolate an edge in a moving image area, and prevent a conversion error in the conversion of an interlaced scanning image into a progressive scanning image.

According to the present invention, there is provided an image processing apparatus including: an inter-field interpolating means for interpolating a pixel of an image of a progressive system using a pixel of a field of an image of an interlacing system to be converted and a pixel of a different field; an intra-field interpolating means for interpolating a pixel of the image of the progressive system using pixels within the field of the image of the interlacing system to be converted; a determining means for determining whether a pixel to be interpolated of the image of the progressive system is a moving image pixel or a still image pixel; and a selecting means for selecting either the pixel interpolated by the intra-field interpolating means or the pixel interpolated by the inter-field interpolating means on the basis of a result of the determination by the determining means.

The image processing apparatus can further include an edge enhancing means for enhancing an edge of the image of the interlacing system to be converted.

The edge enhancing means can subject each of pixels of the image of the interlacing system to horizontal-direction one-dimensional filter processing and vertical-direction one-dimensional filter processing to enhance thereby the edge of the image.

The image processing apparatus can further include a central pixel energy calculating means for calculating vertical-direction central pixel energy and horizontal-direction central pixel energy around each of the pixels from pixel values around the pixel, and the edge enhancing means can perform the filter processing on a pixel whose vertical-direction central pixel energy and horizontal-direction central pixel energy calculated by the central pixel energy calculating means exceed a predetermined value.

The inter-field interpolating means can interpolate the pixel by copying the pixel of the different field onto the field of the image of the interlacing system to be converted as it is.

The image processing apparatus can further include a correlation detecting means for detecting the correlation between pixels at positions symmetrical with respect to a point of the pixel to be interpolated within the field of the image of the interlacing system to be converted, the pixels being on horizontal lines over and under the pixel to be interpolated, and the intra-field interpolating means can interpolate the pixel using a combination of pixels having the strongest correlation with each other detected by the correlation detecting means.

The correlation detecting means can detect, as correlation, an absolute value of a difference between pixel values of the pixels at positions symmetrical with respect to the point of the pixel to be interpolated.

The image processing apparatus can further include a proximity energy calculating means for calculating the proximity energy of the pixel to be interpolated from pixel values near the pixel to be interpolated, and when a value of the proximity energy of the pixel to be interpolated calculated by the proximity energy calculating means is higher than a predetermined threshold value, the intra-field interpolating means can interpolate the pixel on the basis of the pixels having the strongest correlation with each other detected by the correlation detecting means.

The proximity energy may be a sum of the absolute values of the differences between pixel values of a predetermined number of pixels that are present on lines extending in a horizontal direction over and under the pixel to be interpolated and that are opposite to each other in a direction perpendicular to the lines or a sum of the absolute values of the differences between pixel values of a predetermined number of pixels that are present on the lines extending in the horizontal direction over and under the pixel to be interpolated and that are present at positions symmetrical with respect to a point of the pixel to be interpolated.

According to the present invention, there is provided an image processing method including: an inter-field interpolating step for interpolating a pixel of an image of a progressive system using a pixel of a field of an image of an interlacing system to be converted and a pixel of a different field; an intra-field interpolating step for interpolating a pixel of the image of the progressive system using pixels within the field of the image of the interlacing system to be converted; a determining step for determining whether a pixel to be interpolated of the image of the progressive system is a moving image pixel or a still image pixel; and a selecting step for selecting either the pixel interpolated by processing of the intra-field interpolating step or the pixel interpolated by processing of the inter-field interpolating step on the basis of a result of the determination by processing of the determining step.

According to the present invention, there is provided a program including: an inter-field interpolation control step for controlling interpolation of a pixel of an image of a progressive system using a pixel of a field of an image of an interlacing system to be converted and a pixel of a different field; an intra-field interpolation control step for controlling interpolation of a pixel of the image of the progressive system using pixels within the field of the image of the interlacing system to be converted; a determination control step for controlling determination of whether a pixel to be interpolated of the image of the progressive system is a moving image pixel or a still image pixel; and a selection control step for controlling selection of either the pixel interpolated by processing of the intra-field interpolation control step or the pixel interpolated by processing of the inter-field interpolation control step on the basis of a result of the determination by processing of the determination control step.

According to the present invention, there is provided a program on a recording medium, including: an inter-field interpolation control step for controlling interpolation of a pixel of an image of a progressive system using a pixel of a field of an image of an interlacing system to be converted and a pixel of a different field; an intra-field interpolation control step for controlling interpolation of a pixel of the image of the progressive system using pixels within the field of the image of the interlacing system to be converted; a determination control step for controlling determination of whether a pixel to be interpolated of the image of the progressive system is a moving image pixel or a still image pixel; and a selection control step for controlling selection of either the pixel interpolated by processing of the intra-field interpolation control step or the pixel interpolated by processing of the inter-field interpolation control step on the basis of a result of the determination by processing of the determination control step.

The apparatus, the method, and the program for image processing according to the present invention interpolate a pixel of an image of a progressive system using a pixel of a field of an image of an interlacing system to be converted and a pixel of a different field, interpolate a pixel of the image of the progressive system using pixels within the field of the image of the interlacing system to be converted, determine whether a pixel to be interpolated of the image of the progressive system is a moving image pixel or a still image pixel, and select either the intra-field interpolated pixel or the inter-field interpolated pixel on the basis of a result of the determination.

BRIEF DESCRIPTION OF THE DRAWINGS

FIG. 18 is a diagram of assistance in explaining media.

DETAILED DESCRIPTION OF THE PREFERRED EMBODIMENTS

Figure 1:
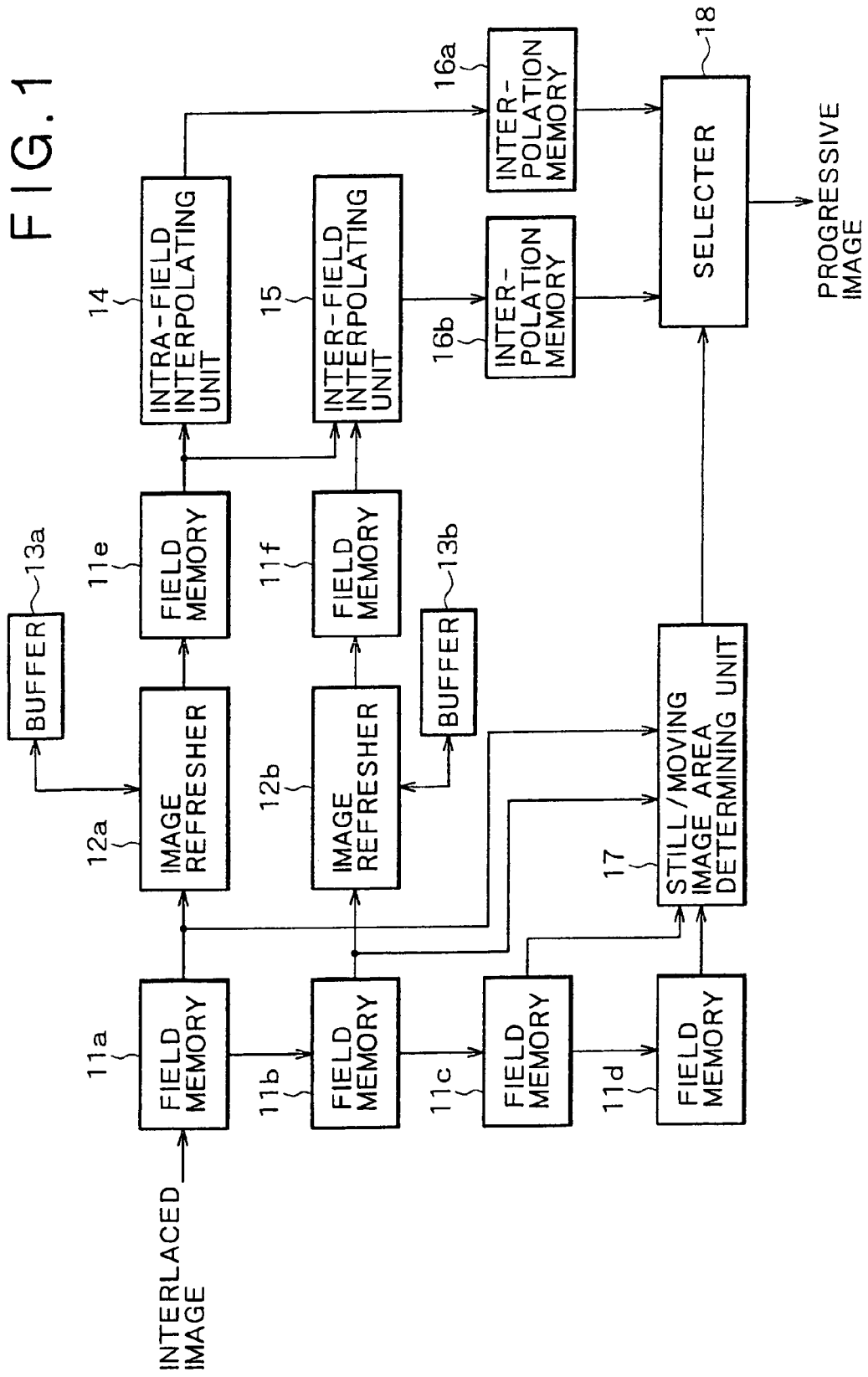
FIG. 1 is a block diagram of an image processing apparatus to which the present invention is applied.

FIG. 1 shows a configuration of an embodiment of an image processing apparatus according to the present invention. Field memories 11a to 11f temporarily store information for one field of an image of an interlaced scanning system (hereinafter referred to as an interlaced image) inputted thereto and then output the information to units in a succeeding stage. Specifically, the field memory 11a stores image information for one field inputted at a predetermined time t, and at a next time t+1, the field memory 11a outputs the field data stored from the time t to an image refresher 12a, a still/moving image area determining unit 17 and the field memory 11b. At the same time, the field memory 11a stores new field data of the time t+1. The field memory 11b stores the field data of the time t inputted from the field memory 11a at the time t+1.

At a time t+2, the field memory 11a outputs the field data of the time t+1 to the image refresher 12a, the still/moving image area determining unit 17, and the field memory 11b, and stores new field data of the time t+2. At the same time t+2, the field memory 11b outputs the field data of the time t to a field memory 11c, an image refresher 12b, and the still/moving image area determining unit 17, and stores the field data of the time t+1 inputted from the field memory 11a. The field memory 11c stores the field data of the time t inputted from the field memory 11b.

Further, at a time t+3, the field memory 11a outputs the field data of the time t+2 that has been stored until the time t+3 to the field memory 11b, the image refresher 12a, and the still/moving image area determining unit 17, and stores field data of the time t+3. At the same time, the field memory 11b outputs the field data of the time t+1 to the field memory 11c, the image refresher 12b, and the still/moving image area determining unit 17, and stores the field data of the time t+2 inputted from the field memory 11a. The field memory 11c outputs the field data of the time t stored therein to a field memory 11d and the still/moving image area determining unit 17.

Further, at a time t+4, the field memory 11a outputs the field data of the time t+3 that has been stored therein until the time t+4 to the field memory 11b, the image refresher 12a, and the still/moving image area determining unit 17, and stores field data of the time t+4 inputted to the field memory 11a. The field memory 11b outputs the field data of the time t+2 stored therein to the field memory 11c, the image refresher 12b, and the still/moving image area determining unit 17, and stores the field data of the time t+3 inputted from the field memory 11a. The field memory 11c outputs the field data of the time t+1 stored therein to the field memory 11d and the still/moving image area determining unit 17, and stores the field data of the time t+2 inputted from the field memory 11b. The field memory 1d outputs the field data of the time t stored therein to the still/moving image area determining unit 17, and stores the field data of the time t+1 inputted from the field memory 11c.

Thus, the field memories 11a to 11d store four continuous pieces of field data at all times while transferring the field data sequentially. Field memories 11e and 11f store pieces of field data supplied from the image refreshers 12a and 12b, respectively, in which pieces of field data, an edge in a vertical direction and an edge in a horizontal direction are each enhanced, and then sequentially output the pieces of field data to an intra-field interpolating unit 14 and an inter-field interpolating unit 15.

The image refresher 12a performs processing of a one-dimensional vertical filter and a one-dimensional horizontal filter on the field data inputted from the field memory 11a while using a buffer 13a as required, thereby enhancing edge portions in the vertical direction and the horizontal direction, and then outputs resulting field data to the field memory 11e. Processing of the image refresher 12b and a buffer 13b is the same as above; however, the image refresher 12b and the buffer 13b perform field data processing with a temporal delay corresponding to one field.

The intra-field interpolating unit 14 generates and interpolates a pixel in a moving image area of a progressive image from the edge-enhanced field data stored in the field memory 11e and then outputs the pixel as a progressive image to an interpolation memory 16a to store the pixel therein. Details of intra-field interpolation processing will be described later.

The inter-field interpolating unit 15 generates and interpolates a pixel in a still image area of a progressive image from the two continuous pieces of field data stored in the field memories 11e and 11f and then outputs the generated progressive image to an interpolation memory 16b to store the progressive image therein. Details of inter-field interpolation processing will be described later.

The still/moving image area determining unit 17 determines from the four continuous pieces of field data inputted from the field memories 11a to 11d whether a pixel to be interpolated of the newest piece of field data is a pixel in a still image area or a pixel in a moving image area and then stores the result. The processing of determining whether the pixel to be interpolated is a pixel in a still image area or a pixel in a moving image area will be described later in detail.

On the basis of the information stored in the still/moving image area determining unit 17, a selector 18 reads the pixel interpolated by the intra-field interpolating unit 14 from the interpolation memory 16a when the pixel to be interpolated is a pixel in a moving image area and reads the pixel interpolated by the inter-field interpolating unit 15 from the interpolation memory 16b when the pixel to be interpolated is a pixel in a still image area. The selector 18 thereby generates and outputs a final progressive image.

The IP conversion processing of the image processing apparatus to which the present invention is applied will next be described with reference to the flowchart of FIG. 2.

At a step S1, the field memory 11a outputs field data stored therein to the field memory 11b, the image refresher 12a, and the still/moving image area determining unit 17 and stores field data inputted to the field memory 11a. At the same time, the field memory 11b outputs field data hitherto stored therein to the field memory 11c, the image refresher 12b, and the still/moving image area determining unit 17. The field memory 11c outputs field data hitherto stored therein to the field memory 11d and the still/moving image area determining unit 17 and stores the field data inputted from the field memory 11b. The field memory 11d outputs field data hitherto stored therein to the still/moving image area determining unit 17 and stores the field data inputted from the field memory 11c.

At a step S2, the image refreshers 12a and 12b perform one-dimensional vertical edge enhancement processing.

Figure 3:
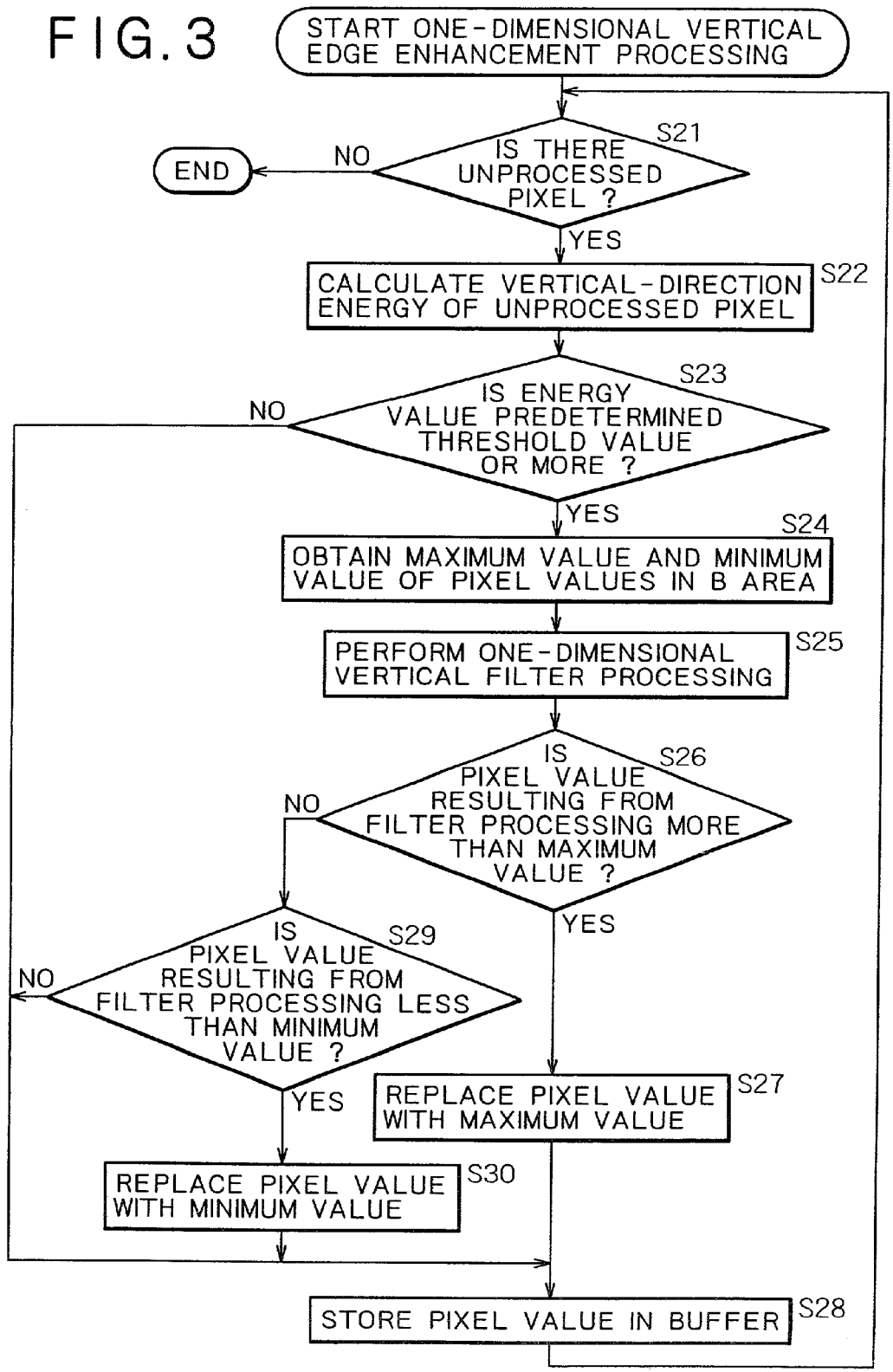
FIG. 3 is a flowchart of assistance in explaining one-dimensional vertical edge enhancement processing.

The one-dimensional vertical edge enhancement processing of the image refreshers 12a and 12b will be described in the following with reference to the flowchart of FIG. 3. Since the image refreshers 12a and 12b perform the same processing on two continuous pieces of field data, the processing of the image refresher 12a will be described in the following.

At a step S21, the image refresher 12a determines whether the field data inputted from the field memory 11a includes an unprocessed pixel. When the image refresher 12a determines that the field data inputted from the field memory 11a includes an unprocessed pixel, the processing proceeds to a step S22.

Figure 4:
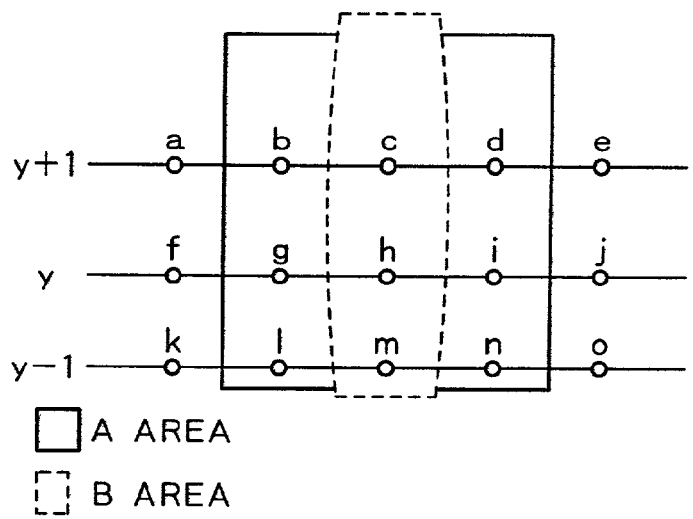
FIG. 4 is a diagram of assistance in explaining a one-dimensional vertical filter.

At the step S22, the image refresher 12a retrieves the unprocessed pixel and then calculates the vertical-direction central pixel energy of the retrieved unprocessed pixel. For example, supposing that there is field data as shown in FIG. 4, in which pixels a to e, pixels f to j, and pixels k to o are disposed on horizontal-direction lines y+1, y, and y−1, respectively, vertical-direction central pixel energy $E_{V-h}$ of an A area around the pixel h (area enclosed by a solid line in the figure) is obtained by the following equation:

$$E_{V-h}=|(b+c+d)-(l+m+n)| \quad (1)$$

Here, b, c, d, l, m, and n are pixel values of the pixels b, c, d, l, m, and n, respectively. Thus, vertical-direction central pixel energy $E_V$ of the equation (1) is the absolute value of the difference between the sums of the pixel values on the upper line and the lower line with the unprocessed pixel at the center. Therefore, when the upper pixels are correlated with the lower pixels, there is no large difference between the pixel values of the upper pixels and the lower pixels, and accordingly the vertical-direction central pixel energy is low. On the other hand, when the upper pixels are not correlated with the lower pixels, there is often a large difference between the pixel values of the upper pixels and the lower pixels, and consequently the vertical-direction central pixel energy is high.

The image refresher 12a obtains the vertical-direction central pixel energy $E_{V-h}$ of the unprocessed pixel by calculating the above equation (1).

At a step S23, the image refresher 12a determines whether the obtained vertical-direction central pixel energy $E_V$ is at a predetermined value or more. When the image refresher 12a determines that the obtained vertical-direction central pixel energy $E_V$ is at the predetermined value or more, that is, when the image refresher 12a determines that the unprocessed pixel has no strong correlation with the pixels in the vertical direction, the processing proceeds to a step S24.

At the step S24, the image refresher 12a obtains a maximum value and a minimum value by comparison of the pixel values of the three vertical pixels including the unprocessed pixel. Specifically, when the unprocessed pixel is the pixel h, as shown in FIG. 4, for example, the image refresher 12a reads the pixel values of the vertical pixels c, h, and m (B area enclosed by a broken line in FIG. 4), including the pixel h, and then obtains a maximum value (c, h, m) and a minimum value (c, h, m) of the pixel values as shown in FIG. 5.

Figure 5:
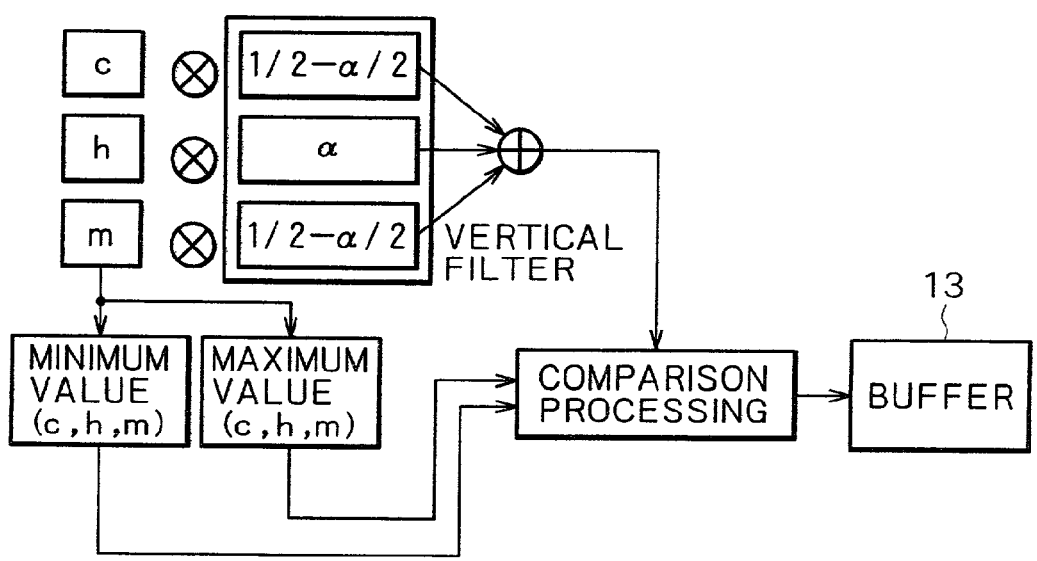
FIG. 5 is a diagram of assistance in explaining a one-dimensional vertical filter.

At a step S25, the image refresher 12a performs one-dimensional vertical filter processing, as shown in FIG. 5, on the pixels c, h, and m in the B area shown in FIG. 4.

Specifically, the processing of the one-dimensional vertical filter is (½−α/2, α, ½−α/2) (1<α☐2), and a pixel value $h_{V\text{-}filter}$ resulting from the filter processing is obtained by a calculation as expressed by the following equation (2):

$$h_{V\text{-}filter}=c\times(½-α/2)+h\times α+m\times(½-α/2) \quad (2)$$

where α is a constant that can be set arbitrarily in a range of 1<α☐2, and thus enables adjustment of a degree of edge enhancement.

At a step S26, the image refresher 12a compares the pixel value $h_{V\text{-}filter}$ resulting from the filter processing with the maximum value (c, h, m), as shown in FIG. 5, and thereby determines whether the pixel value $h_{V\text{-}filter}$ resulting from the filter processing is more than the maximum value (c, h, m). When the image refresher 12a determines that the pixel value $h_{V\text{-}filter}$ resulting from the filter processing is more than the maximum value (c, h, m), the image refresher 12a replaces the pixel value $h_{V\text{-}filter}$ with the maximum value (c, h, m) at a step S27.

At a step S28, the image refresher 12a stores in the buffer 13a the maximum value (c, h, m) replacing the pixel value $h_{V\text{-}filter}$ as the pixel value of the pixel h. The processing then returns to the step S21 to repeat the same processes until it is determined that the one-dimensional vertical edge enhancement processing is performed on all the pixels.

When the image refresher 12a determines that the vertical-direction central pixel energy $E_V$ is not at the predetermined value or more, that is, when the image refresher 12a determines that the unprocessed pixel has a strong correlation with the pixels in the vertical direction at the step S23, the processing proceeds to the step S28. The image refresher 12a then stores the pixel value of the pixel h in the buffer 13a, as it is without having filter processing performed thereon. The processing returns to the step S21 to repeat the processes from the step S21 on down.

When the image refresher 12a determines at the step S26 that the pixel value $h_{V\text{-}filter}$ resulting from the filter processing is not more than the maximum value (c, h, m), the image refresher 12a compares the pixel value $h_{V\text{-}filter}$ resulting from the filter processing with the minimum value (c, h, m), and thereby determines whether the pixel value $h_{V\text{-}filter}$ resulting from the filter processing is less than the minimum value (c, h, m) at a step S29. When the image refresher 12a determines that the pixel value $h_{V\text{-}filter}$ resulting from the filter processing is less than the minimum value (c, h, m), the processing proceeds to a step S30.

The image refresher 12a replaces the pixel value $h_{V\text{-}filter}$ with the minimum value (c, h, m) at the step S30. At the step S28, the image refresher 12a stores in the buffer 13a the minimum value (c, h, m) replacing the pixel value $h_{V\text{-}filter}$ as the pixel value of the pixel h.

When the image refresher 12a determines at the step S29 that the pixel value $h_{V\text{-}filter}$ resulting from the filter processing is not less than the minimum value (c, h, m), the processing proceeds to the step S28. The image refresher 12a stores the pixel value $h_{V\text{-}filter}$ resulting from the filter processing in the buffer 13a as the pixel value of the pixel h. The processing then returns to the step S21.

Thus, when the processing of the step S23 shows that the value of the vertical-direction central pixel energy is the predetermined threshold value or more (when the unprocessed pixel has no strong correlation with the pixels in the vertical direction), the maximum value (c, h, m) and the minimum value (c, h, m) obtained by the processing of the step S24 are considered to be a maximum value and a minimum value in a local area of the pixels c, h, and m, as shown in FIG. 5. When the pixel value resulting from the filter processing at the step S25 falls within a range defined by the maximum value and the minimum value, the pixel value resulting from the filter processing is stored in the buffer 13a. The pixel value below that range is replaced with the minimum value, and the minimum value is stored in the buffer 13a. The pixel value above that range is replaced with the maximum value, and the maximum value is stored in the buffer 13a. When the processing of the step S23 shows that the value of the vertical-direction central pixel energy is not the predetermined threshold value or more, that is, when the unprocessed pixel has a strong correlation with the pixels in the vertical direction, the original pixel value is stored in the buffer 13a as it is.

Figure 2:
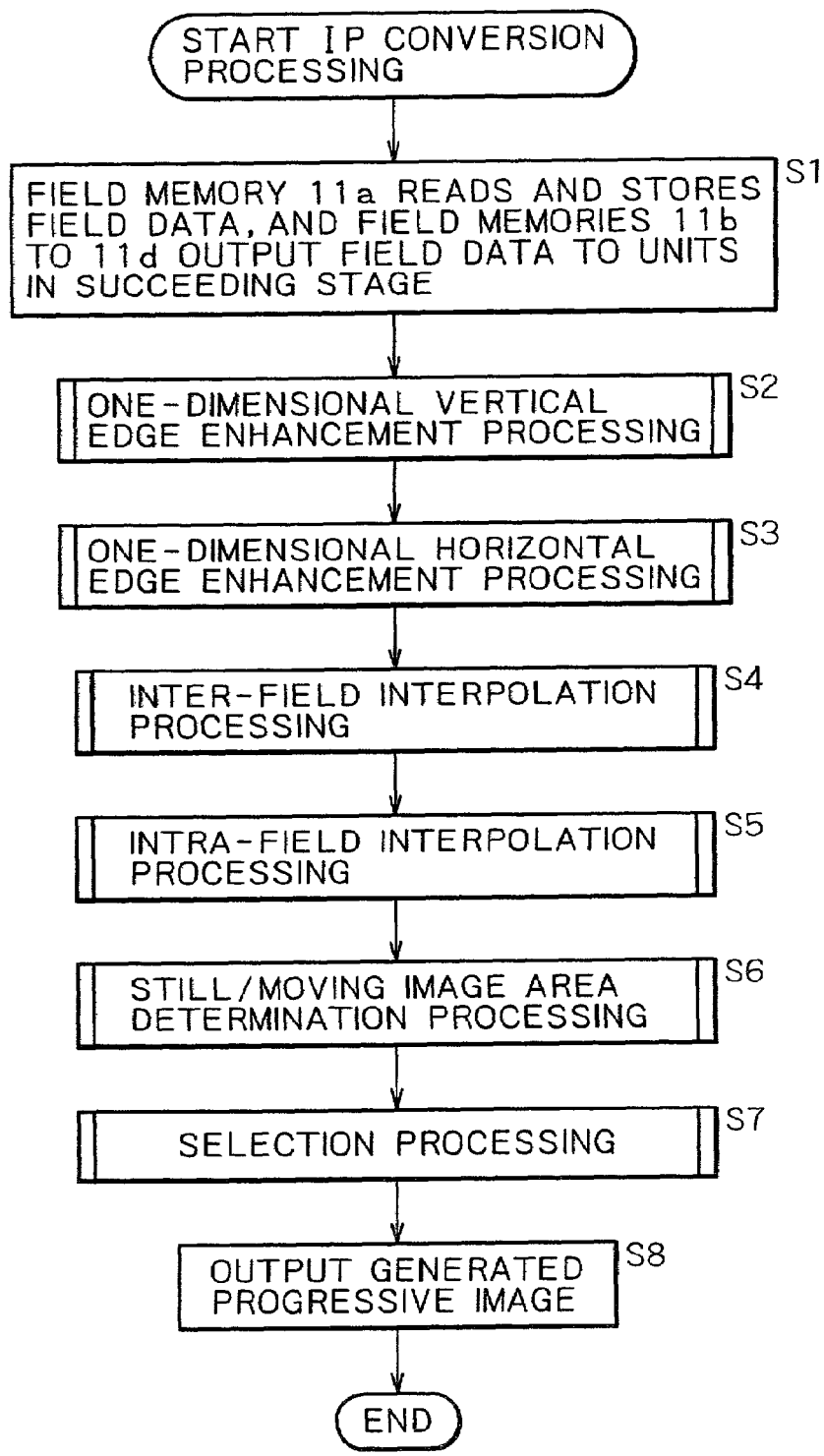
FIG. 2 is a flowchart of assistance in explaining IP conversion processing of the image processing apparatus of FIG. 1.

The description will return to the flowchart of FIG. 2.

After performing the one-dimensional vertical edge enhancement processing at the step S2, the image refresher 12a performs one-dimensional horizontal edge enhancement processing at a step S3.

Figure 6:
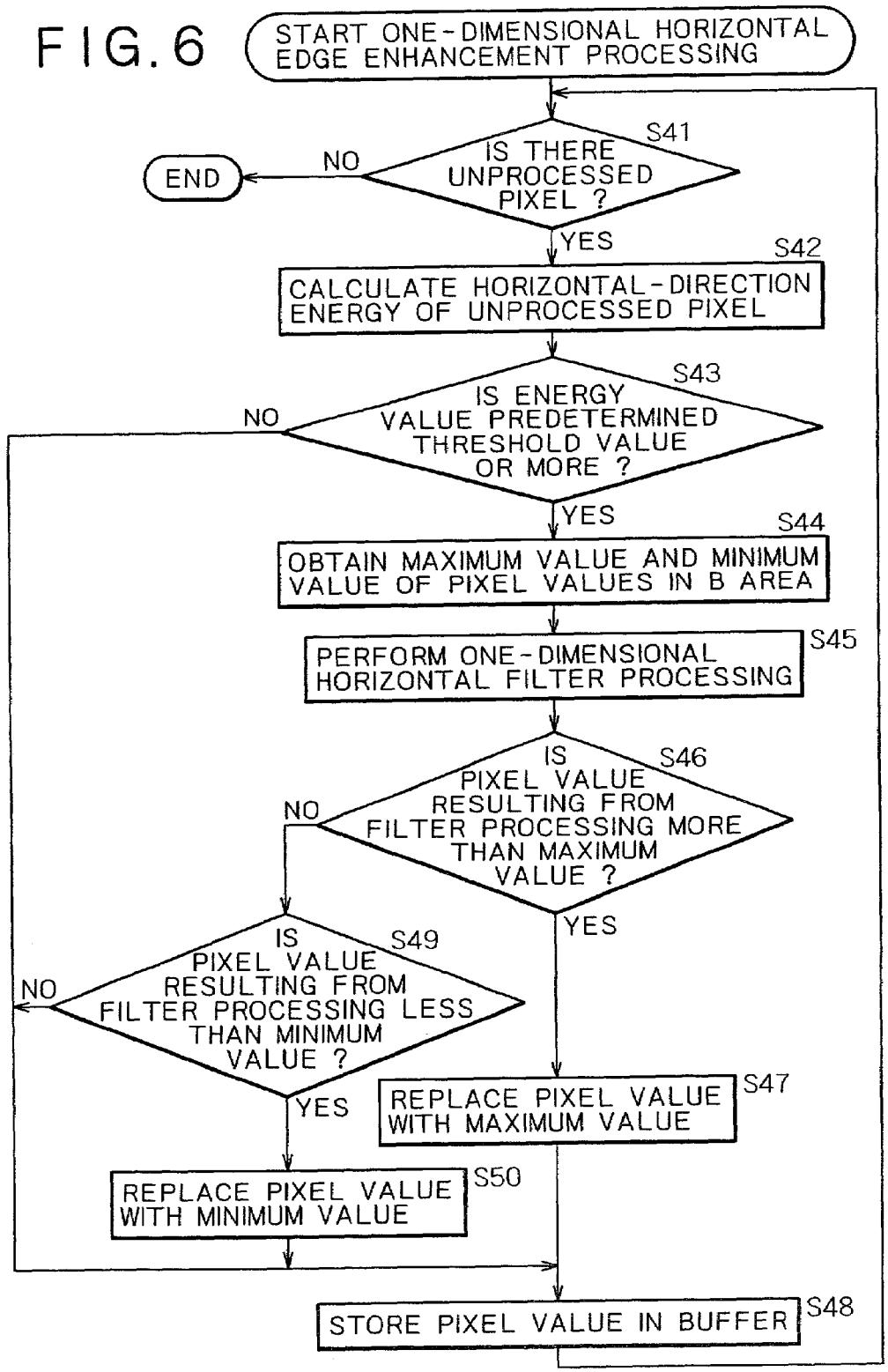
FIG. 6 is a flowchart of assistance in explaining one-dimensional horizontal edge enhancement processing.

The one-dimensional horizontal edge enhancement processing will be described in the following with reference to a flowchart of FIG. 6.

At a step S41, the image refresher 12a determines whether the pixels of the field data stored in the buffer 13a that have been subjected to the one-dimensional vertical edge enhancement processing include a pixel that has not been subjected to the one-dimensional horizontal edge enhancement processing. When the image refresher 12a determines that there is an unprocessed pixel, the processing proceeds to a step S42.

Figure 7:
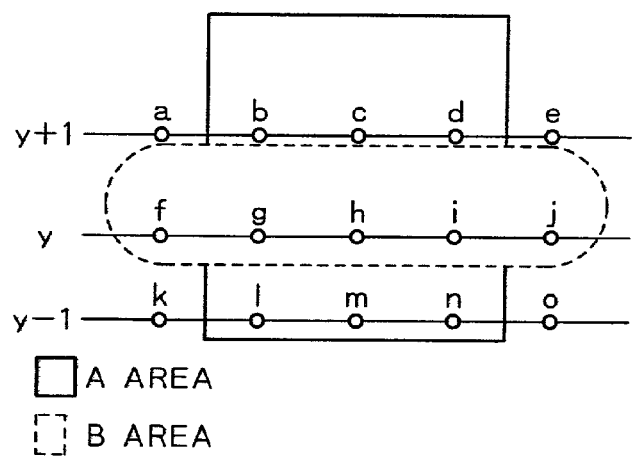
FIG. 7 is a diagram of assistance in explaining a one-dimensional horizontal filter.

At the step S42, the image refresher 12a retrieves the unprocessed pixel and then calculates the horizontal-direction central pixel energy of the retrieved unprocessed pixel. For example, supposing that there are field data as shown in FIG. 7, in which pixels a to e, pixels f to j, and pixels k to o are disposed on horizontal-direction lines y+1, y, and y−1, respectively, the horizontal-direction central pixel energy $E_{H\text{-}h}$ of an A area around the pixel h (area enclosed by a solid line in the figure) is obtained by the following equation:

$$E_{H\text{-}h}=|(d+i+n)-(b+g+l)| \quad (3)$$

where b, d, g, i, l, and n are pixel values of the pixels b, d, g, i, l, and n, respectively. Thus, horizontal-direction central pixel energy $E_H$ of the equation (3) is the absolute value of the difference between the sums of the pixel values on the right line and the left line with the unprocessed pixel at the center. Therefore, when the right pixels are correlated with the left pixels, there is no large difference between the pixel values of the right pixels and the left pixels, and accordingly the horizontal-direction central pixel energy is low. On the other hand, when the right pixels are not correlated with the left pixels, there is often a large difference between the pixel values of the right pixels and the left pixels, and consequently the horizontal-direction central pixel energy is high.

The image refresher 12a obtains the horizontal-direction central pixel energy $E_H$ of the unprocessed pixel by calculating the above equation (3).

At a step S43, the image refresher 12a determines whether the obtained horizontal-direction central pixel energy $E_H$ is at a predetermined value or more. When the image refresher 12a determines that the obtained horizontal-direction central pixel energy $E_H$ is at the predetermined value or more, that is, when the image refresher 12a determines that the unprocessed pixel has no strong correlation with the pixels in the horizontal direction, the processing proceeds to a step S44.

At the step S44, the image refresher 12a obtains a maximum value and a minimum value by comparison of the pixel values of the five horizontal pixels including the unprocessed pixel. Specifically, when the unprocessed pixel is the pixel h, as shown in FIG. 7, for example, the image refresher 12a reads the pixel values of the horizontal pixels f to j (B area enclosed by a broken line in FIG. 7), including the pixel h, and then obtains a maximum value (f, g, h, i, j) and a minimum value (f, g, h, i, j) of the pixel values, as shown in FIG. 8.

Figure 8:
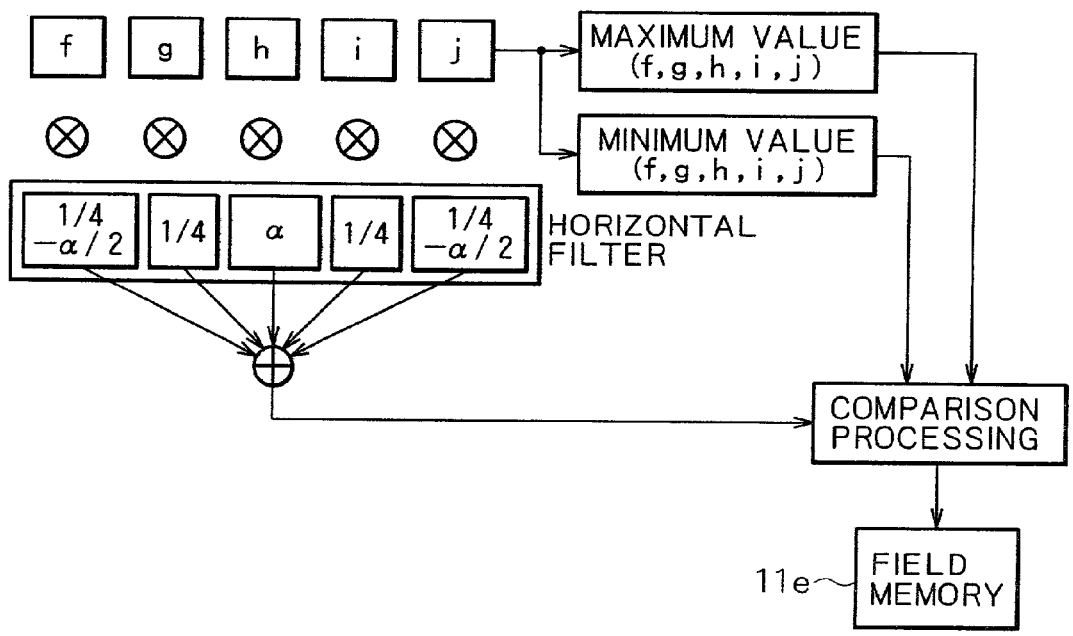
FIG. 8 is a diagram of assistance in explaining a one-dimensional horizontal filter.

At a step S45, the image refresher 12a performs one-dimensional horizontal filter processing, as shown in FIG. 8, on the pixels f to j in the B area shown in FIG. 7. Specifically, the processing of the one-dimensional horizontal filter is (¼−α/2, ¼, α, ¼, ¼−α/2) (1<α≦2), and a pixel value $h_{H\text{-}filter}$ resulting from the filter processing is obtained by a calculation expressed by the following equation (4):

$$h_{H\text{-}filter}=f\times(¼-\alpha/2)+g\times¼+h\times\alpha+i\times¼+j\times(¼-\alpha/2) \quad (4)$$

where α is a constant that can be set arbitrarily in a range of 1<α≦2, and thus enables adjustment of a degree of edge enhancement.

At a step S46, the image refresher 12a compares the pixel value $h_{H\text{-}filter}$ resulting from the filter processing with the maximum value (f, g, h, i, j), and thereby determines whether the pixel value $h_{H\text{-}filter}$ resulting from the filter processing is more than the maximum value (f, g, h, i, j). When the image refresher 12a determines that the pixel value $h_{H\text{-}filter}$ resulting from the filter processing is more than the maximum value (f, g, h, i, j), the image refresher 12a replaces the pixel value $h_{H\text{-}filter}$ with the maximum value (f, g, h, i, j) at a step S47.

At a step S48, the image refresher 12a stores in the field memory 11e the maximum value (f, g, h, i, j) replacing the pixel value $h_{H\text{-}filter}$ as the pixel value of the pixel h. The processing then returns to the step S41 to repeat the same processes until it is determined that the one-dimensional horizontal edge enhancement processing is performed on all the pixels.

When the image refresher 12a determines that the horizontal-direction central pixel energy $E_H$ is not at the predetermined value or more, that is, when the image refresher 12a determines that the unprocessed pixel has a strong correlation with the pixels in the horizontal direction at the step S43, the processing proceeds to the step S48. The image refresher 12a then stores the pixel value of the pixel h in the field memory 11e as it is. The processing returns to the step S41.

When the image refresher 12a determines at the step S46 that the pixel value $h_{H\text{-}filter}$ resulting from the filter processing is not more than the maximum value (f, g, h, i, j), the image refresher 12a compares the pixel value $h_{H\text{-}filter}$ resulting from the filter processing with the minimum value (f, g, h, i, j), and thereby determines whether the pixel value $h_{H\text{-}filter}$ resulting from the filter processing is less than the minimum value (f, g, h, i, j) at a step S49. When the image refresher 12a determines that the pixel value $h_{H\text{-}filter}$ resulting from the filter processing is less than the minimum value (f, g, h, i, j), the processing proceeds to a step S50.

The image refresher 12a replaces the pixel value $h_{H\text{-}filter}$ with the minimum value (f, g, h, i, j) at the step S50. At the step S48, the image refresher 12a stores in the field memory 11e the minimum value (f, g, h, i, j) replacing the pixel value $h_{H\text{-}filter}$ as the pixel value of the pixel h.

When the image refresher 12a determines at the step S49 that the pixel value $h_{H\text{-}filter}$ resulting from the filter processing is not less than the minimum value (f, g, h, i, j), the processing proceeds to the step S48. The image-refresher 12a stores the pixel value $h_{H\text{-}filter}$ resulting from the filter processing in the field memory 11e as the pixel value of the pixel h. The processing then returns to the step S41.

Thus, when the processing of the step S43 shows that the value of the horizontal-direction central pixel energy is the predetermined threshold value or more (when the unprocessed pixel has no strong correlation with the pixels in the horizontal direction), the maximum value (f, g, h, i, j) and the minimum value (f, g, h, i, j) obtained by the processing of the step S44 are considered to be a maximum value and a minimum value in a local area of the pixels f, g, h, i, and j, as shown in FIG. 8. When the pixel value resulting from the filter processing at the step S45 falls within a range defined by the maximum value and the minimum value, the pixel value resulting from the filter processing is stored in the field memory 11e. The pixel value below that range is replaced with the minimum value, and the minimum value is stored in the field memory 11e. The pixel value above that range is replaced with the maximum value, and the maximum value is stored in the field memory 11e. When the processing of the step S43 shows that the value of the horizontal-direction central pixel energy is not the predetermined threshold value or more, the original pixel value is stored in the field memory 11e as it is.

The description will return to the flowchart of FIG. 2.

The image refresher 12b reads field data with a delay corresponding to one field from the field memory 11b in the same timing as the image refresher 12a. Similarly to the image refresher 12a, the image refresher 12b performs the one-dimensional vertical edge enhancement processing and the one-dimensional horizontal edge enhancement processing at the steps S2 and S3, respectively, in FIG. 2. The image refresher 12b thereby generates edge-enhanced field data, and then stores the edge-enhanced field data in the field memory 11f. The processing of the image refresher 12b is the same as that of the image refresher 12a, and therefore its description will be omitted.

After the one-dimensional horizontal edge enhancement processing is performed at the step S3, the inter-field interpolating unit 15 performs inter-field interpolation processing at a step S4.

Figure 9:
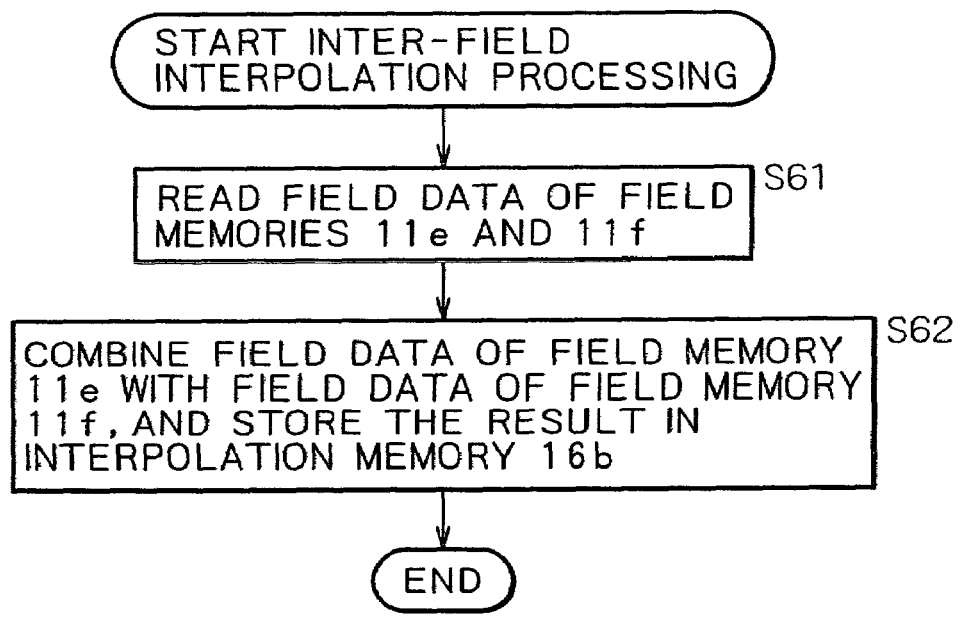
FIG. 9 is a flowchart of assistance in explaining inter-field interpolation processing.

The inter-field interpolation processing will be described in the following with reference to the flowchart of FIG. 9.

At a step S61, the inter-field interpolating unit 15 reads field data stored in the field memories 11e and 11f. At a step S62, the inter-field interpolating unit 15 combines the field data read from the field memory 11e with the field data read from the field memory 11f and then stores the result in the interpolation memory 16b.

Specifically, when field data read at a time t is stored in the field memory 11e, for example, the field data stored in the field memory 11f is read at a time t−1. Thus, the position of pixels arranged in a vertical direction in the field data read at the time t is displaced from the position of pixels arranged in a vertical direction in the field data read at the time t−1, as is shown by pixels A and B in the field data of the time t and pixels C and D in the field data of the time t−1 in FIG. 10. In this case, the position of pixels to be interpolated in the field data of the time t is the same as the position of the pixels in the field data of the time t−1.

Figure 10:
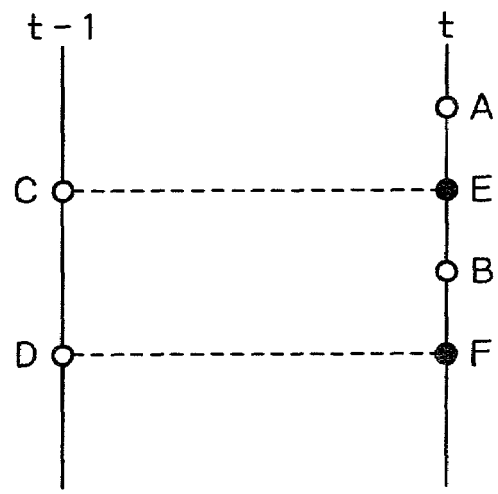
FIG. 10 is a diagram of assistance in explaining the inter-field interpolation processing.

Accordingly, the inter-field interpolating unit 15 combines the field data of the time t−1 as pixels E and F in lines between the pixels of the field data of the time t, as by copying the pixels C and D in FIG. 10, for example. The inter-field interpolating unit 15 thereby generates a progressive picture and then stores the progressive picture in the interpolation memory 16b.

Thus, the pixel values of pixels in a still image area are not varied greatly with time and therefore can be generated by such inter-field interpolation processing.

The description will return to the flowchart of FIG. 2.

After the inter-field interpolation processing is performed at the step S4, the intra-field interpolating unit 14 performs intra-field interpolation processing at a step S5.

Figure 11:
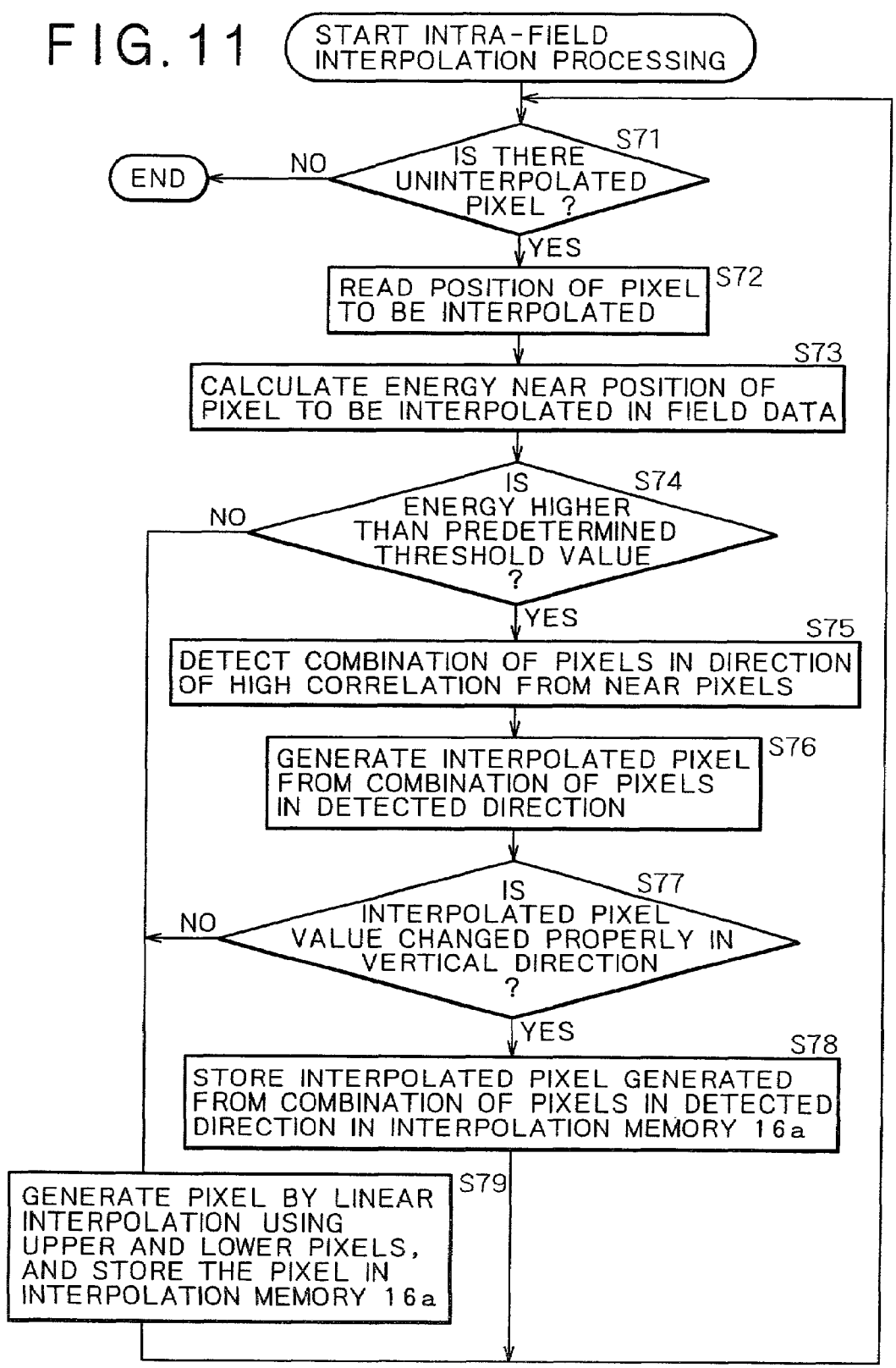
FIG. 11 is a flowchart of assistance in explaining intra-field interpolation processing.

The intra-field interpolation processing of the intra-field interpolating unit 14 will be described in the following with reference to FIG. 11.

At a step S71, the intra-field interpolating unit 14 retrieves field data stored in the field memory 11e to determine whether the field data has an uninterpolated pixel. When the intra-field interpolating unit 14 determines that the field data has an uninterpolated pixel, the processing proceeds to a step S72.

Figure 12:
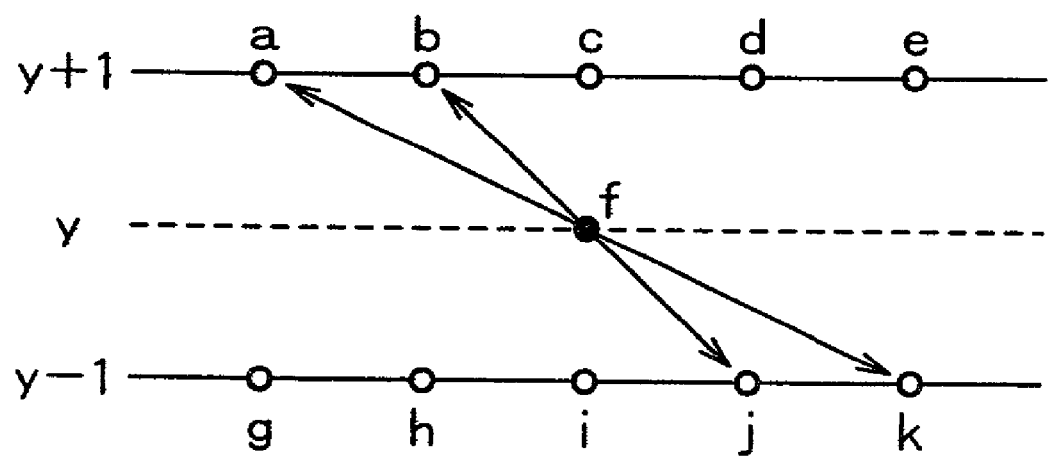
FIG. 12 is a diagram of assistance in explaining the intra-field interpolation processing.

At the step S72, the intra-field interpolating unit 14 reads the position of the pixel to be interpolated. At a step S73, the intra-field interpolating unit 14 obtains proximity energy $E_{near}$ near the position of the pixel to be interpolated. When pixels a to e and pixels g to k are present on horizontal lines y−1 and y+1, respectively, and a pixel f is to be interpolated on a line y between the lines y−1 and y+1, as shown in FIG. 12, for example, the proximity energy $E_{near}$ near the position of the pixel to be interpolated is obtained from the following equation (5):

$$E_{near\text{-}f} = |a-k| + |b-j| + |c-i| + |d-h| + |e-g| \quad (5)$$

Here, a to k are pixel values of the pixels a to k.

Thus, the proximity energy $E_{near}$ near the position of the pixel to be interpolated is the sum of the absolute values of the differences between the pixel values of pixels that are present on the lines over and under the position of the pixel to be interpolated and that are at positions symmetrical with respect to the position of the pixel to be interpolated. Therefore, the higher the value of the proximity energy $E_{near}$, the higher the possibility that the pixel to be interpolated forms an edge portion. On the other hand, the lower the value of the proximity energy $E_{near}$, the higher the possibility that the pixel to be interpolated is not present in an edge or a texture portion.

At a step S74, the intra-field interpolating unit 14 determines whether the proximity energy $E_{near}$ is higher than a predetermined value. When the intra-field interpolating unit 14 determines that the proximity energy $E_{near}$ is higher than the predetermined value (when the intra-field interpolating unit 14 determines that there is a high possibility that the pixel to be interpolated forms an edge portion), the processing proceeds to a step S75.

At the step S75, the intra-field interpolating unit 14 obtains a combination of pixels in a direction of high correlation from the pixels near the pixel to be interpolated. Specifically, the correlation is the absolute value of the difference between the pixel values of pixels present at positions symmetrical with respect to the point of the pixel to be interpolated. For example, as shown in FIG. 12, when the pixel f is to be interpolated, the correlations to be obtained are |a−k|, |b−j|, |c−i|, |d−h|, and |e−g|. After obtaining the correlations, a combination having the lowest value is detected and set as a combination of pixels with the highest correlation. Since a high correlation means no significant change in the pixel value, the lower the absolute value of the pixel value difference, the higher the correlation. When |b−j| has the lowest value, for example, the direction of high correlation shown by a combination of pixels is the direction of a straight line connecting the pixels b and j.

At a step S76, an interpolated pixel is generated from a combination of pixels in a detected direction. When the combination of the pixels b and j shown in FIG. 12 is the combination of pixels in the direction of the highest correlation, for example, the pixel value of the interpolated pixel f is obtained from the following equation (6):

$$f = \tfrac{1}{2} \times (b+j) \tag{6}$$

At a step S77, the intra-field interpolating unit 14 determines whether the interpolated pixel value is changed properly with respect to the pixel values in a vertical direction. When interpolating the pixel f shown in FIG. 12, for example, the intra-field interpolating unit 14 calculates a determination equation J expressed as the following equation (7), and then makes the above determination depending on whether the result of the calculation is positive or negative:

$$J = (f-c) \times (i-f) \tag{7}$$

Here, c and i are the pixel values of the pixels c and i present over and under the interpolated pixel f.

Thus, there is generally a high possibility that the pixel value monotonously increases or monotonously decreases in the vertical direction. This is used to determine whether the pixel value is changed properly. When the pixel value monotonously increases or monotonously decreases, the determination equation J gives a positive value, whereas when the pixel value does not increase monotonously or does not decrease monotonously, the determination equation J gives a negative value.

Accordingly, when the determination equation J gives a positive value, the intra-field interpolating unit 14 determines that the pixel value is changed properly in the vertical direction, and then the processing proceeds to a step S78.

At the step S78, the intra-field interpolating unit 14 stores in the interpolation memory 16a the pixel value generated from the combination of pixels in the direction of high correlation as the pixel value of the interpolated pixel. The processing returns to the step S71 to repeat the above processing steps until all pixels are interpolated.

When the intra-field interpolating unit 14 determines at the step S74 that the proximity energy $E_{near}$ is not higher than the predetermined threshold value, the intra-field interpolating unit 14 generates a pixel value by linear interpolation using an upper and a lower pixel and stores the generated pixel value in the interpolation memory 16a at a step S79. Specifically, when interpolating the pixel f shown in FIG. 12, for example, the intra-field interpolating unit 14 obtains a pixel value from the pixel values of the pixels c and i present over and under the pixel f by the linear interpolation represented by the following equation (8), and then stores the obtained pixel value in the interpolation memory 16a as the pixel value of the interpolated pixel. The processing returns to the step S71 to repeat the above processing steps until all pixels to be interpolated are interpolated.

$$f = \tfrac{1}{2}(c+i) \tag{8}$$

When the intra-field interpolating unit 14 determines at the step S77 that the pixel value is not changed properly in the vertical direction, that is, when the determination equation J gives a negative value, the processing proceeds to the step S79.

The description will return to the flowchart of FIG. 2.

After the intra-field interpolation processing is performed at the step S5, the still/moving image area determining unit 17 performs still/moving image area determination processing at a step S6.

Figure 13:
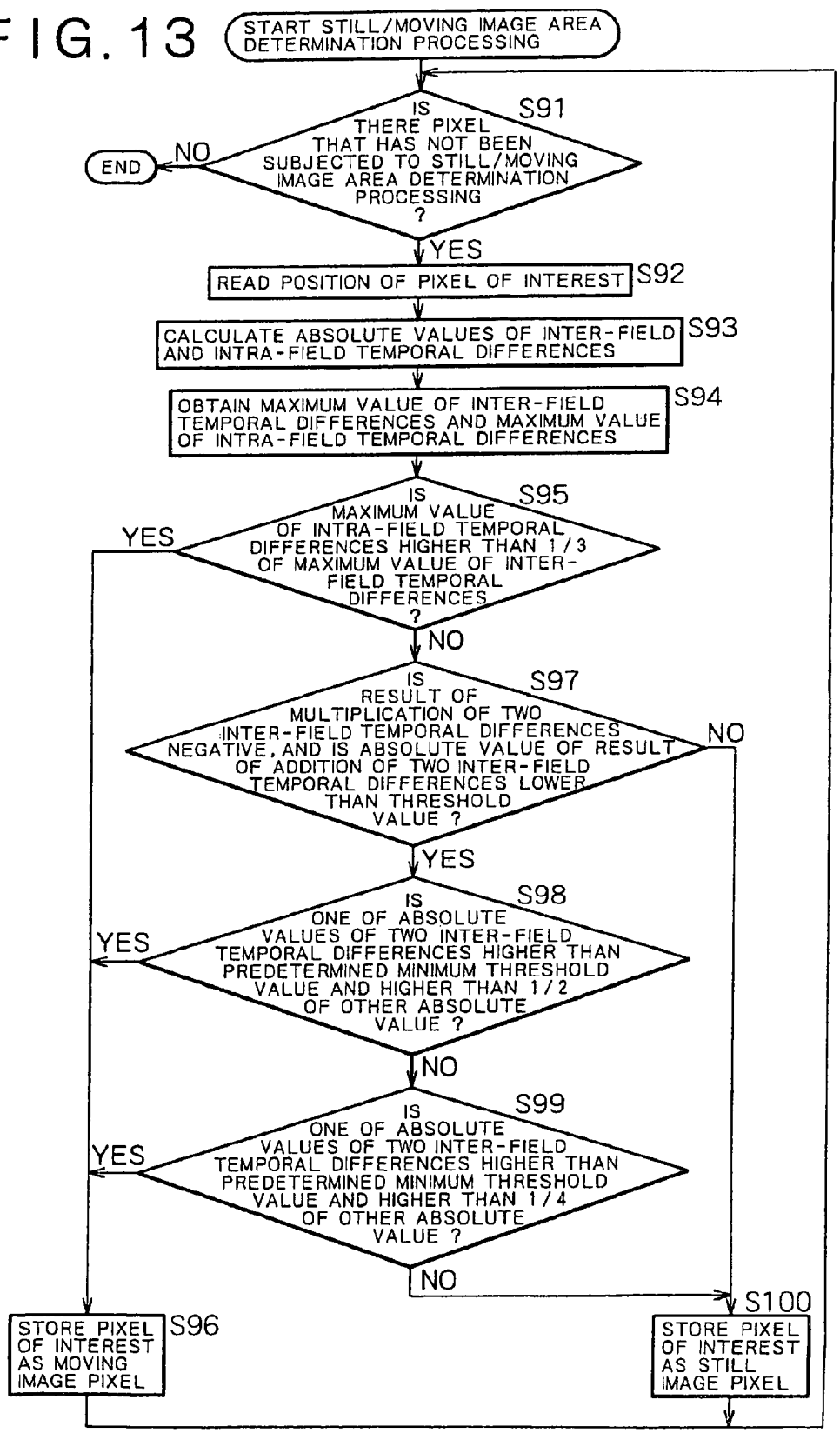
FIG. 13 is a flowchart of assistance in explaining still/moving image area determination processing.

The still/moving image area determination processing will be described with reference to the flowchart of FIG. 13.

At a step S91, the still/moving image area determining unit 17 determines whether there is a pixel that has not been subjected to the still/moving image area determination processing. When the still/moving image area determining unit 17 determines that there is a pixel that has not been subjected to the still/moving image area determination processing, the processing proceeds to a step S92.

Figure 14:
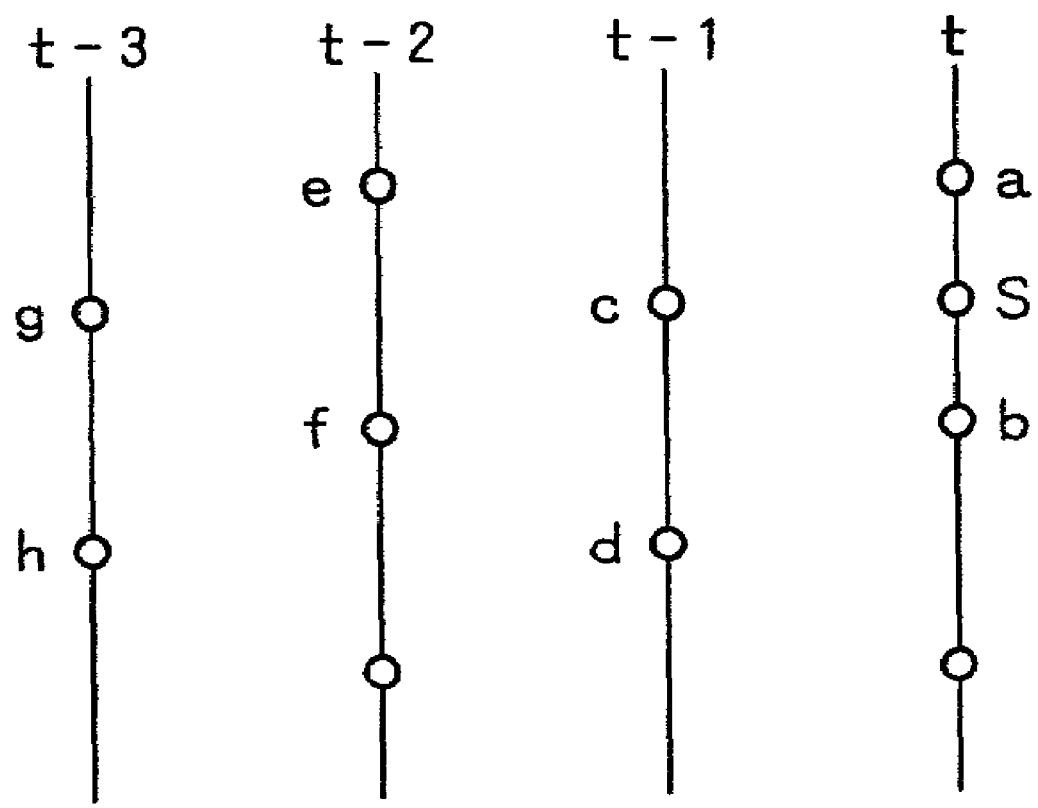
FIG. 14 is a diagram of assistance in explaining the still/moving image area determination processing.

At the step S92, the still/moving image area determining unit 17 retrieves the pixel that has not been subjected to the still/moving image area determination processing as a remarked pixel and then reads the position of the remarked pixel. At a step S93, the still/moving image area determining unit 17 calculates absolute values of temporal differences between inter-field and intra-field pixels (temporal differences between pixel values) near the remarked pixel. Specifically, as shown in FIG. 14, for example, suppose that pixels a and b are present in field data of a time t as pixels arranged in a vertical direction, and a remarked pixel s (pixel to be interpolated) is present between the pixels a and b. Also, suppose that pixels c and d are present in field data of a time t−1, pixels e and f are present in field data of a time t−2, and pixels g and h are present in field data of a time t−3. In this case, the pixels of the field data of the time t and the pixels of the field data of the time t−2 are present on the same vertical line, and the pixels of the field data of the time t−1 and the pixels of the field data of the time t−3 are present on the same vertical line. The alternating lines are displaced by one line in the vertical direction in positional relation to each other. The field data of the times t to t−3 in FIG. 14 indicates pixel positions on the same lines in a horizontal direction.

In this state, absolute values of inter-field temporal differences are |a−c| and |b−c|, and absolute values of intra-field temporal differences are |a−e|, |c−g|, and |b−f|. The still/moving image area determining unit 17 reads the field data of the times t to t−3 from the field memories 11a to 11d, and from the field data, the still/moving image area determining unit 17 calculates the absolute values of inter-field temporal differences (|a−c| and |b−c|) and the absolute values of intra-field temporal differences (|a−e|, |c−g|, and |b−f|).

At a step S94, the still/moving image area determining unit 17 obtains a maximum value of the absolute values of the inter-field temporal differences and a maximum value of the absolute values of the intra-field temporal differences.

At a step S95, the still/moving image area determining unit 17 determines whether the maximum value of the absolute values of the intra-field temporal differences is higher than ⅓ of the maximum value of the absolute values of the inter-field temporal differences. When the still/moving image area determining unit 17 determines that the maximum value of the absolute values of the intra-field temporal differences is higher than ⅓ of the maximum value of the absolute values of the inter-field temporal differences, the still/moving image area determining unit 17 stores the remarked pixel as a moving image pixel at a step S96. The processing returns to the step S91 to repeat the same processing steps until all pixels are subjected to the still/moving image area determination processing.

When the still/moving image area determining unit 17 determines at the step S95 that the maximum value of the absolute values of the intra-field temporal differences is not higher than ⅓ of the maximum value of the absolute values of the inter-field temporal differences, the still/moving image area determining unit 17 determines at a step S97 whether a result of multiplication of two inter-field temporal differences is negative and an absolute value of a result of addition of the two inter-field temporal differences is lower than a predetermined threshold value. When the still/moving image area determining unit 17 determines that the result of multiplication of the two inter-field temporal differences is negative and the absolute value of the result of addition of the two inter-field intra-field temporal differences is lower than the predetermined threshold value, the processing proceeds to a step S98.

At the step S98, the still/moving image area determining unit 17 determines whether one of the absolute values of the two inter-field temporal differences is higher than a predetermined minimum threshold value and higher than ½ of the other absolute value. When the still/moving image area determining unit 17 determines that one of the absolute values of the two inter-field temporal differences is higher than the predetermined minimum threshold value and higher than ½ of the other absolute value, the processing proceeds to the step S96. When the still/moving image area determining unit 17 determines that one of the absolute values of the two inter-field temporal differences is not higher than the predetermined minimum threshold value and higher than ½ of the other absolute value, the processing proceeds to a step S99.

At the step S99, the still/moving image area determining unit 17 determines whether one of the absolute values of the two inter-field temporal differences is higher than a predetermined maximum threshold value and higher than ¼ of the other absolute value. When the still/moving image area determining unit 17 determines that one of the absolute values of the two inter-field temporal differences is higher than the predetermined maximum threshold value and higher than ¼ of the other absolute value, the processing proceeds to the step S96. When the still/moving image area determining unit 17 determines that one of the absolute values of the two inter-field temporal differences is not higher than the predetermined maximum threshold value and higher than ¼ of the other absolute value, the processing proceeds to a step S100.

At the step S100, the still/moving image area determining unit 17 stores the remarked pixel as a pixel in a still image area. The processing proceeds to the step S91.

When the still/moving image area determining unit 17 determines at the step S97 that the result of multiplication of the two inter-field temporal differences is not negative or the absolute value of the result of addition of the two inter-field temporal differences is not lower than the predetermined threshold value, the processing proceeds to the step S100.

Thus, when the still/moving image area determining unit 17 determines by the processing of the step S95 that the maximum value of the absolute values of the intra-field temporal differences is higher than ⅓ of the maximum value of the absolute values of the inter-field temporal differences, the remarked pixel is considered to be a moving image pixel. Otherwise, under a condition that the result of multiplication of the two inter-field temporal differences is negative and the absolute value of the result of addition of the two inter-field temporal differences is lower than the predetermined threshold value, the remarked pixel also is considered to be a moving image pixel when one of the absolute values of the two inter-field temporal differences is higher than the predetermined minimum threshold value and higher than ½ of the other absolute value or when one of the absolute values of the two inter-field temporal differences is higher than the predetermined maximum threshold value and higher than ¼ of the other absolute value. Otherwise, the remarked pixel is considered to be a still image pixel.

The description will return to the flowchart of FIG. 2.

After the still/moving image area determination processing is performed at the step S6, the selector 18 performs selection processing at a step S7.

Figure 15:
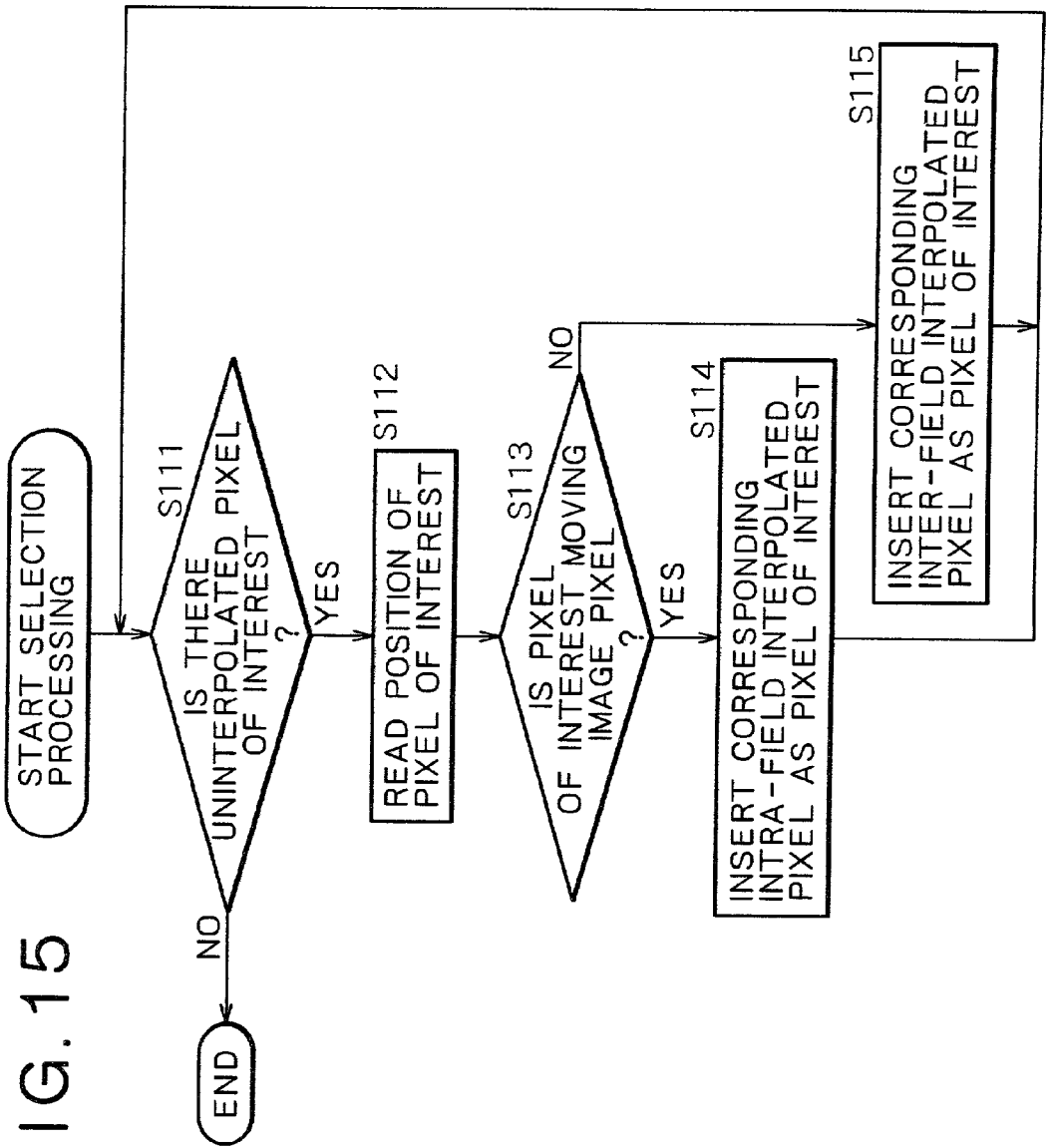
FIG. 15 is a flowchart of assistance in explaining selection processing.

The selection processing will be described with reference to a flowchart of FIG. 15.

At a step S111, the selector 18 determines whether there is an uninterpolated remarked pixel. At a step S112, the selector 18 reads the position of the remarked pixel. At a step S113, the selector 18 inquires of the still/moving image area determining unit 17 whether the remarked pixel corresponding to the read pixel position is a moving image pixel. When the selector 18 thereby determines that the remarked pixel is a moving image pixel, the processing proceeds to a step S114.

At the step S114, the selector 18 reads a pixel value which corresponds to the read pixel position and is interpolated as a pixel in a moving image area and stored in the interpolation memory 16a and then inserts and stores the pixel value as a pixel to be outputted as a progressive picture. The processing returns to the step S111.

When the selector 18 determines at the step S113 that the remarked pixel is not a moving image pixel, that is, the remarked pixel is a still image pixel, the selector 18 reads a pixel value which corresponds to the read pixel position and is interpolated as a pixel in a still image area and stored in the interpolation memory 16b and then inserts and stores the pixel value as a pixel to be outputted as a progressive picture at a step S115. The processing returns to the step S111. The processing from the step S111 on down is repeated until all pixels are interpolated.

Thus, on the basis of the read position of pixels of interest, the selector 18 inquires of the still/moving image area determining unit 17 whether each of the pixels of interest is stored as a pixel in a still image area or stored as a pixel in a moving image area. When the remarked pixel is a pixel in a moving image area, the selector 18 inserts a pixel value interpolated as a moving image pixel by the intra-field interpolating unit 14 and stored in the interpolation memory 16a. When the remarked pixel is a pixel in a still image area, the selector 18 inserts a pixel value interpolated as a still image pixel by the inter-field interpolating unit 15 and stored in the interpolation memory 16b.

The description will return to the flowchart of FIG. 2.

After the selection processing at the step S7 is completed, the selector 18 outputs a generated progressive picture to an apparatus in a succeeding stage not shown in the figure at a step S8.

Figure 16:
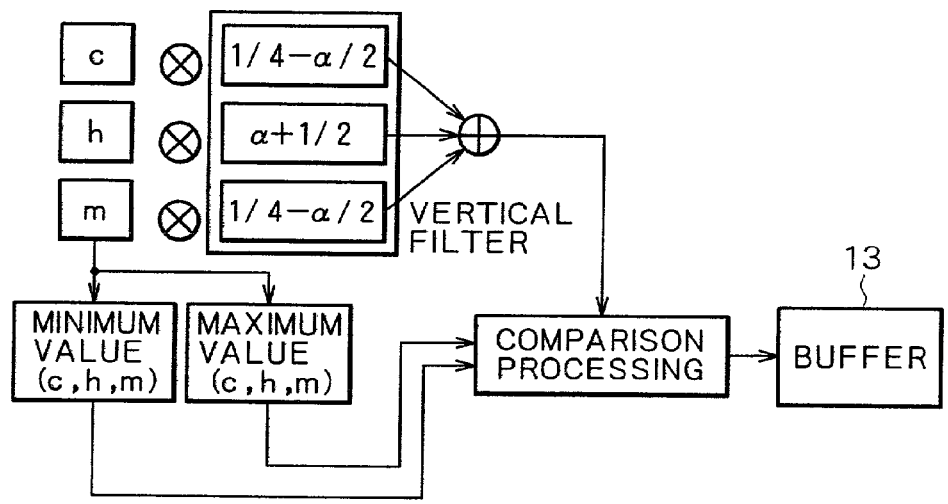
FIG. 16 is a diagram of assistance in explaining a one-dimensional vertical filter.
Figure 17:
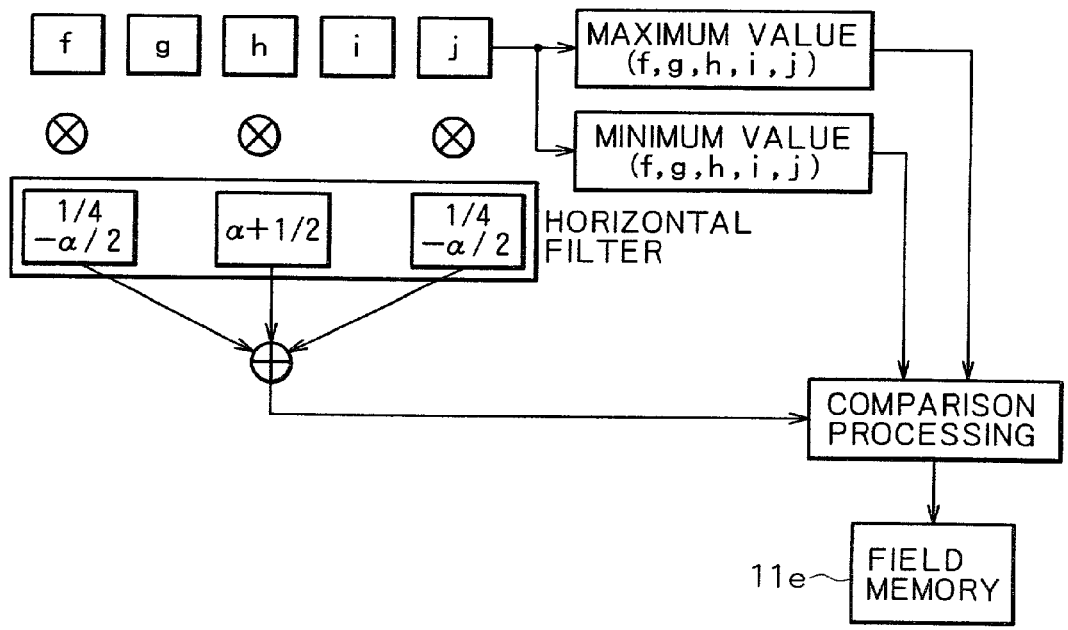
FIG. 17 is a diagram of assistance in explaining a one-dimensional horizontal filter.

While the above description has been made by taking a case where the image refresher 12a uses a three-tap vertical filter and a five-tap horizontal filter, the image refresher 12a also may use a three-tap vertical filter and a three-tap horizontal filter. In this case, as shown in FIG. 16, the vertical filter may be configured for processing as (¼−α/2, α+½, ¼−α/2), and the horizontal filter may be configured for processing as (¼−α/2, α+½, ¼−α/2), for example. The horizontal filter performs filter processing on every other pixel value of five read pixel values (for example on pixels f, h, and j when pixels f, g, h, i, and j are sequentially read). Also, a combination of a three-tap vertical filter and a five-tap horizontal filter and a combination of a three-tap vertical filter and a three-tap horizontal filter both may be made available and selectable by the user. In addition, a vertical filter and a horizontal filter having a different number of taps may be used. Furthermore, pieces of field data or pixels used for interpolation do not need to be continuous; for example, one in every two or more pieces of field data or pixels may be used.

Furthermore, in addition to the equation (5), the following equation (9) may be used as an arithmetic equation for obtaining the proximity energy near an unprocessed pixel, and selection between the equations (5) and (9) may be made by the user.

$$E_{near-f}=|a-g|+|b-h|+|c-i|+|d-j|+|e-k| \qquad (9)$$

According to the present invention described above, in processing for converting an interlaced image into a progressive image, it is possible to enhance properly an edge even in an image with an insufficient high-frequency component, improve vertical resolution in a still image area, and smoothly interpolate an oblique edge in a moving image area. It is also possible to prevent an error in conversion processing.

The series of processing steps described above may be carried out not only by hardware but also by software. When the series of processing steps is to be carried out by software, a program forming the software is installed from a recording medium onto a computer that is incorporated in special hardware or a general-purpose personal computer that can perform various functions by installing various programs thereon, for example.

FIG. 18 shows a configuration of an embodiment of a personal computer when the image processing apparatus is realized by software. A CPU 101 of the personal computer controls the entire operation of the personal computer. When a command is inputted from an input unit 106 formed by a keyboard, a mouse and the like by the user via a bus 104 and an input/output interface 105, the CPU 101 executes a program stored in a ROM (Read Only Memory) 102 in response to the command. Also, the CPU 101 loads into a RAM (Random Access Memory) 103a program read from a magnetic disk 111, an optical disk 112, a magneto-optical disk 113, or a semiconductor memory 114 connected to a drive 110 and installed in a memory unit 108 and then executes the program. The above-described functions of the image processing apparatus are thus realized by software. The CPU 101 also controls a communication unit 109 for communication with the outside and thereby sends and receives data.

Examples of the recording medium on which the program is recorded include not only program-recorded package media distributed to users to provide the program separately from computers, such as magnetic disks 111 (including floppy disks), optical disks 112 (including CD-ROM (Compact Disk-Read Only Memory) and DVD (Digital Versatile Disk)), magneto-optical disks 113 (including MD (Mini-Disk)), or semiconductor memories 114, as shown in FIG. 18, but also a hard disk included in the memory unit 108 and the ROM 102 storing the program and supplied to the user in a state of being preincorporated in the computer.

It is to be noted that in the present specification, the steps describing the program recorded on a recording medium include not only processing steps carried out in time series in the described order but also processing steps carried out in parallel or individually and not necessarily in time series.

The apparatus, the method, and the program for image processing according to the present invention interpolate a pixel of an image of a progressive system using a pixel of a field of an image of an interlacing system to be converted and a pixel of a different field, interpolate a pixel of the image of the progressive system using pixels within the field of the image of the interlacing system to be converted, determine whether a pixel to be interpolated of the image of the progressive system is a moving image pixel or a still image pixel, and select either the intra-field interpolated pixel or the inter-field interpolated pixel on the basis of a result of the determination. Therefore, in processing for converting an interlaced image into a progressive image, it is possible to enhance an edge even in an image with an insufficient high-frequency component, improve vertical resolution in a still image area, and smoothly interpolate an oblique edge in a moving image area. It is also possible to prevent an error in conversion processing.

The entire disclosure of Japanese Patent Application No. 2001-006365 filed on Jan. 15, 2001 including the specification, claims, drawings and summary is incorporated herein by reference in its entirety.

What is claimed is:

1. An image processing apparatus for converting an image of an interlacing system into an image of a progressive system, said image processing apparatus comprising:
    an inter-field interpolating means for interpolating a pixel of said image of the progressive system using a pixel of a field of said image of the interlacing system to be converted and a pixel of a different field;
    an intra-field interpolating means for interpolating a pixel of said image of the progressive system using pixels within the field of said image of the interlacing system to be converted;
    a determining means for determining whether a pixel to be interpolated of said image of the progressive system is a moving image pixel or a still image pixel; and
    a selecting means for selecting either said pixel interpolated by said intra-field interpolating means or said pixel interpolated by said inter-field interpolating means on the basis of a result of the determination by said determining means; wherein
    said determining means determines that said pixel to be interpolated of said image of the progressive system is a moving image pixel based at least in part on the absolute values of at least one of intra-field temporal differences and inter-field temporal differences.

2. An image processing apparatus as claimed in claim 1, further including an edge enhancing means for enhancing an edge of said image of the interlacing system to be converted.

3. An image processing apparatus as claimed in claim 2, wherein said edge enhancing means subjects each of pixels of said image of the interlacing system to horizontal-direction one-dimensional filter processing and vertical-direction one-dimensional filter processing to thereby enhance the edge of said image.

4. An image processing apparatus as claimed in claim 2, further including a central pixel energy calculating means for calculating vertical-direction central pixel energy and horizontal-direction central pixel energy around each of said pixels from pixel values around said pixel,
    wherein said edge enhancing means performs the filter processing on said pixel whose vertical-direction central pixel energy and horizontal-direction central pixel energy calculated by said central pixel energy calculating means exceed a predetermined value.

5. An image processing apparatus as claimed in claim 4, wherein said determining means determines that said pixel to be interpolated of said image of the progressive system is a moving image pixel in at least one of the following circumstances:

when a maximum value of absolute values of the intra-field temporal differences is higher than ⅓ of a maximum value of absolute values of the inter-field temporal differences;

when one of the absolute values of two inter-field temporal differences is higher than a predetermined minimum threshold value and higher than ½ of the other absolute value, and the result of multiplying the two inter-field temporal differences is negative and the absolute value of the result of adding the two inter-field temporal differences is lower than a predetermined threshold value; and when one of the absolute values of the two inter-field temporal differences is higher than a predetermined maximum threshold value and higher than ¼ of the other absolute value, and the result of multiplying the two inter-field temporal differences is negative and the absolute value of the result of adding the two inter-field temporal differences is lower than the predetermined threshold value.

6. An image processing apparatus as claimed in claim 1, wherein said inter-field interpolating means interpolates the pixel by copying the pixel of the different field onto the field of said image of the interlacing system to be converted as it is.

7. An image processing apparatus as claimed in claim 1, further including a correlation detecting means for detecting correlation between pixels at positions symmetrical with respect to a point of said pixel to be interpolated within the field of said image of the interlacing system to be converted, said pixels being on horizontal lines over and under said pixel to be interpolated, wherein said intra-field interpolating means interpolates said pixel using a combination of pixels having the strongest correlation with each other detected by said correlation detecting means.

8. An image processing apparatus as claimed in claim 7, wherein said correlation detecting means detects, as correlation, an absolute value of a difference between pixel values of the pixels at positions symmetrical with respect to the point of said pixel to be interpolated.

9. An image processing apparatus as claimed in claim 7, further including a proximity energy calculating means for calculating proximity energy of said pixel to be interpolated from pixel values near said pixel to be interpolated, wherein when a value of the proximity energy of said pixel to be interpolated calculated by said proximity energy calculating means is higher than a predetermined threshold value, said intra-field interpolating means interpolates said pixel on the basis of the pixels having the strongest correlation with each other detected by said correlation detecting means.

10. An image processing apparatus as claimed in claim 9, wherein said proximity energy is a sum of absolute values of differences between pixel values of a predetermined number of pixels that are present on lines extending in a horizontal direction over and under said pixel to be interpolated and are opposite to each other in a direction perpendicular to said lines, or a sum of absolute values of differences between pixel values of a predetermined number of pixels that are present on said lines extending in the horizontal direction over and under said pixel to be interpolated and are present at positions symmetrical with respect to the point of said pixel to be interpolated.

11. An image processing apparatus as claimed in claim 1, wherein said determining means determines that said pixel to be interpolated of said image of the progressive system is a moving image pixel in at least one of the following circumstances:

when a maximum value of absolute values of the intra-field temporal differences is higher than ⅓ of a maximum value of absolute values of the inter-field temporal differences;

when one of the absolute values of two inter-field temporal differences is higher than a predetermined minimum threshold value and higher than ½ of the other absolute value, and the result of multiplying the two inter-field temporal differences is negative and the absolute value of the result of adding the two inter-field temporal differences is lower than a predetermined threshold value; and when one of the absolute values of the two inter-field temporal differences is higher than a predetermined maximum threshold value and higher than ¼ of the other absolute value, and the result of multiplying the two inter-field temporal differences is negative and the absolute value of the result of adding the two inter-field temporal differences is lower than the predetermined threshold value.

12. An image processing method for an image processing apparatus, said image processing apparatus converting an image of an interlacing system into an image of a progressive system, said image processing method comprising:

an inter-field interpolating step for interpolating a pixel of said image of the progressive system using a pixel of a field of said image of the interlacing system to be converted and a pixel of a different field;

an intra-field interpolating step for interpolating a pixel of said image of the progressive system using pixels within the field of said image of the interlacing system to be converted;

a determining step for determining whether a pixel to be interpolated of said image of the progressive system is a moving image pixel or a still image pixel; and a selecting step for selecting either said pixel interpolated by processing of said intra-field interpolating step or said pixel interpolated by processing of said inter-field interpolating step on the basis of a result of the determination by processing of said determining step; wherein said determining step determines that said pixel to be interpolated of said image of the progressive system is a moving image pixel based at least in part on the absolute values of at least one of intra-field temporal differences and inter-field temporal differences.

13. A program for execution by a computer for controlling an image processing apparatus, said image processing apparatus converting an image of an interlacing system into an image of a progressive system, said program comprising:

an inter-field interpolation control step for controlling interpolation of a pixel of said image of the progressive system using a pixel of a field of said image of the interlacing system to be converted and a pixel of a different field;

an intra-field interpolation control step for controlling interpolation of a pixel of said image of the progressive system using pixels within the field of said image of the interlacing system to be converted;

a determination control step for controlling determination of whether a pixel to be interpolated of said image of the progressive system is a moving image pixel or a still image pixel; and a selection control step for controlling selection of either said pixel interpolated by processing of said intra-field interpolation control step or said pixel interpolated by processing of said inter-field interpolation control step on the basis of a result of the determination by processing of said determination control step; wherein said determination control step determines that said pixel to be interpolated of said image of the progressive system is a moving image pixel based at least in part on the absolute values of at least one of intra-field temporal differences and inter-field temporal differences.

14. A recording medium for recording a computer readable program for controlling an image processing apparatus, said image processing apparatus converting an image of an interlacing system into an image of a progressive system, said program comprising:

an inter-field interpolation control step for controlling interpolation of a pixel of said image of the progressive system using a pixel of a field of said image of the interlacing system to be converted and a pixel of a different field;

an intra-field interpolation control step for controlling interpolation of a pixel of said image of the progressive system using pixels within the field of said image of the interlacing system to be converted;

a determination control step for controlling determination of whether a pixel to be interpolated of said image of the progressive system is a moving image pixel or a still image pixel; and a selection control step for controlling selection of either said pixel interpolated by processing of said intra-field interpolation control step or said pixel interpolated by processing of said inter-field interpolation control step on the basis of a result of the determination by processing of said determination control step; wherein said determination control step determines that said pixel to be interpolated of said image of the progressive system is a moving image pixel based at least in part on the absolute values of at least one of intra-field temporal differences and inter-field temporal differences.

* * * * *